(12) United States Patent
Simonis

(10) Patent No.: US 12,533,452 B2
(45) Date of Patent: Jan. 27, 2026

(54) WEARABLE AND PORTABLE DEVICE FOR RECIRCULATING FLOW DIALYSIS

(71) Applicant: ICINNOVATION BV, RX Oirschot (NL)

(72) Inventor: Frank Simonis, RX Oirschot (NL)

( * ) Notice: Subject to any disclaimer, the term of this patent is extended or adjusted under 35 U.S.C. 154(b) by 592 days.

(21) Appl. No.: 17/907,547

(22) PCT Filed: Feb. 18, 2021

(86) PCT No.: PCT/NL2021/050105
§ 371 (c)(1),
(2) Date: Sep. 28, 2022

(87) PCT Pub. No.: WO2021/167453
PCT Pub. Date: Aug. 26, 2021

(65) Prior Publication Data
US 2023/0147619 A1    May 11, 2023

(30) Foreign Application Priority Data

Feb. 18, 2020  (EP) ..................................... 20157823
Jun. 4, 2020  (EP) ..................................... 20178395
Nov. 11, 2020  (EP) ..................................... 20206942

(51) Int. Cl.
*A61M 1/28* (2006.01)
*A61M 1/14* (2006.01)
*A61M 1/16* (2006.01)

(52) U.S. Cl.
CPC .......... *A61M 1/284* (2014.02); *A61M 1/1524* (2022.05); *A61M 1/153* (2022.05);
(Continued)

(58) Field of Classification Search
CPC .... A61M 1/1524; A61M 1/153; A61M 1/154; A61M 1/155; A61M 1/1562;
(Continued)

(56) References Cited

U.S. PATENT DOCUMENTS

| 2010/0114012 A1* | 5/2010 | Sandford | A61M 1/28 604/28 |
| 2010/0312172 A1* | 12/2010 | Hoffman | A61M 1/155 604/28 |
| 2013/0240361 A1* | 9/2013 | Simonis | B01J 20/06 204/647 |

* cited by examiner

*Primary Examiner* — John Kim
(74) *Attorney, Agent, or Firm* — Patshegen IP; Moshe Pinchas

(57) ABSTRACT

The invention relates to a dialysis device that provides recirculating flow dialysis in a wearable and portable format. It uses an exchangeable purification unit holding a volume of dialysate and/or a sorbent system for the in-situ regeneration of dialysate. The invented dialysis device comprises a carrier that is mounted on a replaceable cartridge. The carrier holds the electronics, user-interface, actuators and sensors. It actuates, controls and monitors the dialysis operation. The cartridge is a replaceable part that is connected to the patient via a flexible tubing. It consists of a reusable housing with a memory chip and holds a disposable inlay containing the purification unit with fluid lines, connectors, dialysate and/or sorbents in combination with a nanofilter. The cartridge is intended for use during the day, as a wearable system. The cartridge can be enlarged with an extension set to offer more capacity. The extended cartridge is intended to be used during the night as a bedside device.

10 Claims, 8 Drawing Sheets

(52) U.S. Cl.
CPC ............ *A61M 1/154* (2022.05); *A61M 1/155* (2022.05); *A61M 1/1562* (2022.05); *A61M 1/15632* (2022.05); *A61M 1/159* (2022.05); *A61M 1/1696* (2013.01); *A61M 1/282* (2014.02); *A61M 1/285* (2013.01); *A61M 1/1565* (2022.05); *A61M 2202/0486* (2013.01); *A61M 2202/0498* (2013.01); *A61M 2202/07* (2013.01); *A61M 2202/08* (2013.01); *A61M 2205/12* (2013.01); *A61M 2205/123* (2013.01); *A61M 2205/126* (2013.01); *A61M 2205/128* (2013.01); *A61M 2205/15* (2013.01); *A61M 2205/502* (2013.01); *A61M 2209/088* (2013.01)

(58) Field of Classification Search
CPC ............ A61M 1/15632; A61M 1/1565; A61M 1/159; A61M 1/1696; A61M 1/282; A61M 1/284; A61M 1/285; A61M 2202/0486; A61M 2202/0498; A61M 2202/07; A61M 2202/08; A61M 2205/12; A61M 2205/123; A61M 2205/126; A61M 2205/128; A61M 2205/15; A61M 2205/502; A61M 2209/088
See application file for complete search history.

WEARABLE AND PORTABLE DEVICE FOR RECIRCULATING FLOW DIALYSIS

FIELD OF THE INVENTION

The invention relates to a dialysis device in a wearable and/or portable format for home use.

BACKGROUND OF THE INVENTION

Failure in renal function can be treated with different dialysis modalities, depending on patient characteristics and hospital resources. Peritoneal dialysis (PD) can be first choice in situations like hypotension, disturbed coagulation, or difficult venous access. Existing peritoneal dialysis techniques are CAPD (continuous ambulatory peritoneal dialysis) and APD (automated peritoneal dialysis). Both techniques use a peritoneal dialysate fluid (typically 2 L) that is entered in the abdomen and that is drained after a certain time when it is saturated with toxins. This is repeated 4 to 5 times per day (manually, CAPD) or at night (automated, APD). The main disadvantage of PD is the limited efficacy. This is due to the intermittent procedure of CAPD and APD and the rapid saturation of the dialysate in the abdomen. A second drawback is the high glucose concentration in the dialysate added as osmotic agent in order to extract excess fluid from the patient. A high peak in glucose concentration induces a reaction of the peritoneal membrane resulting in a lowering of its functionality over time hereby limiting the technique survival (typically 5 years). Continuous flow peritoneal dialysis (CFPD) where fresh dialysate is recirculated continuously is a much more effective treatment than conventional PD. The continuous recirculation enhances the efficacy of the peritoneal dialysis treatment and high peaks in glucose concentration can be prevented. So far, continuous flow peritoneal dialysis requires connection to a stationary dialysis machine for long periods per day resulting in the patient being immobilized. This is not practical and hinders its application.

Several efforts have been undertaken to develop a wearable and/or portable device that would allow for continuous flow peritoneal dialysis in a more practical setting. Best known system is described in patent application US2011/0184340 where a system is presented that recirculates peritoneal dialysate which is being regenerated by a sorbent cartridge. The sorbent system is described in patent application US2011/0171713. It contains four components: active carbon (binding organic toxins such as creatinine, uric acid etc), immobilized urease (enzyme converting urea into ammonia and carbon dioxide), zirconium phosphate (binding cations such as potassium, calcium, magnesium and ammonia) and hydrous zirconium oxide (removing anions such as phosphate). This sorbent system has proven to be effective in toxin removal but commercialization is hampered due to some physiological drawbacks and high costs of the system. Main causes are: (1) the urease enzyme has a limited shelf life (2) the enzyme converts urea into large amounts of (toxic) ammonia that can only be removed by a large volume of zirconium phosphate (3) next to ammonia a large amount of carbon dioxide is formed that needs to be degassed from the dialysate (4) the zirconium phosphate also binds magnesium ions and calcium ions that need to be re-infused separately (5) upon ion exchange, both the zirconium phosphate and zirconium oxide release sodium ions which is unfavorable for the electrolyte balance of the patient. The sodium release, limited shelf-life, need for degassing and re-infusing of electrolytes and the difficult control of ammonium are obstructing a successful market introduction. Similar systems are presented in others patent applications such as US2010/0314314 and US2014/8777892 but with the same drawbacks.

In patent application US2015/0290384 a different sorbent system is presented comprising active carbon (binding most of the organic toxins), a metal (Cu)-complexed chitosan (binding urea) and an uncomplexed chitosan (binding metal ions). In this system the unwanted release of metal (Cu) ions is a too high risk factor.

Patent application WO2016/190794 describes a sorbent system with a large amount of active carbon (organic toxins and urea), a phosphate resin (polystyrene complexed with Lanthanum or Ferric ions) and a cation exchange resin for the removal of potassium. Because of the poor absorption capacity for urea, this system demands for a large volume of carbon that counteracts a wearable system.

SUMMARY OF THE INVENTION

It is an object of the present invention to overcome the above mentioned problems with unwanted release of ions and with a high volume of required sorbents (especially for urea) that counteracts wearability and leads to high costs.

The problem is solved according to the invention by a dialysis system that recirculates dialysate in a continuous or tidal mode and that makes use of a purification unit to regenerate the dialysate in-situ. The purification unit is held in a small cartridge for daytime use (wearable, carry-on system). The purification unit contains a volume with dialysate and/or a volume holding a sorbent system to boost the removal capacity of toxins. The sorbent system comprises two components: active carbon and a binder for anions. The sorbent system is designed to bind and remove toxins such as phosphate, small and middle molecules and protein bound toxins (creatinine, beta2-microglobulin, p-cresyl sulfate, indoxyl sulfate, hippuric acid, CMPF). Optionally a third sorbent component might be added to scavenge specific contaminants in the dialysate fluid such as glucose degradation products. However the system can also be used without a sorbent system. In that case the dialysate volume of the device is used to expand and dilute the peritoneal dialysate volume in the abdomen externally.

For dialysis during the night the cartridge is enlarged with an extension set (portable system). The function of the extension set is to remove also the bulk of the daily produced urea and potassium toxins. These are small ions that diffuse rapidly and can easily be removed in an overnight session of 8 hours. A second function—in case of peritoneal dialysis—is to offer the possibility to release an osmotic agent (such as glucose) for fluid extraction if needed.

The recirculation of the dialysate can be continuous or in tidal mode. Continuous recirculation demands for a double lumen catheter or two separate catheters. As peritoneal patients usually have one single lumen catheter in place, it is expected that most patients will use the system in tidal mode.

At a typical flow rate of 200 ml/min the hourly circulation of dialysate amounts to 6 liters (tidal mode) or 12 liters (continuous mode). For a nighttime session this means a dialysate circulation volume of 48 or 96 liters. In current CAPD and APD procedures only 8-15 liters of dialysate are flushed in and out. The increased circulation volume augments the mass transfer in the peritoneal cavity. Hereby the efficacy of the dialysis treatment is enhanced. During daytime a similar volume can be recirculated at a reduced flow rate of 100 ml/min.

The invention is also applicable for hemodialysis. In that case the system is connected to the patient via a double lumen central venous catheter or via a shunt or fistula. Instead of dialysate, blood is recirculated and cleansed by the purification unit and extension set. A dialyzer filter is in place to separate the blood from the fluid in the purification unit and extension set.

BRIEF DESCRIPTION OF THE DRAWINGS

The invention will be further elucidated below on the basis of drawings. These drawings show an embodiment of the device according to the present invention. In the drawings.

DETAILED DESCRIPTION OF THE INVENTION

Figure 1:
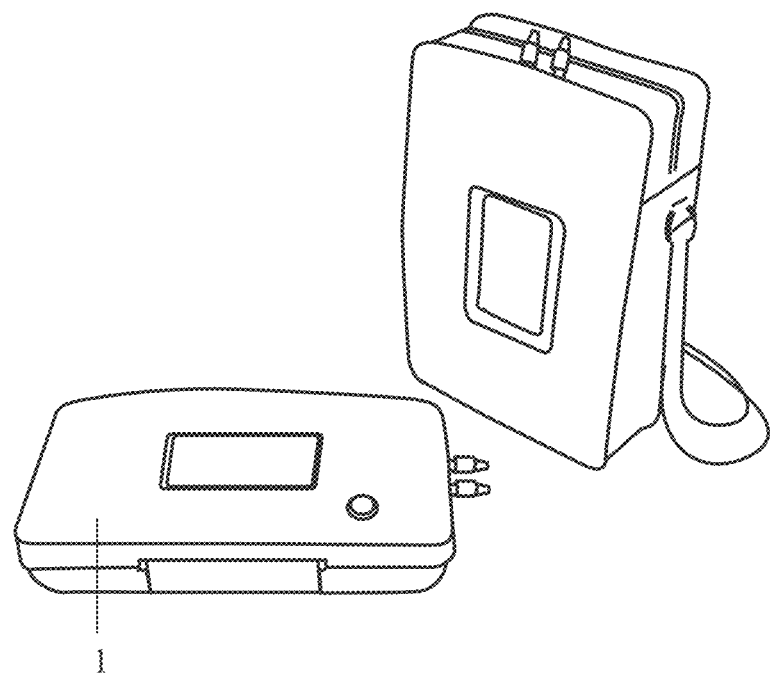
FIG. 1 shows a wearable device with daytime cartridge.

The problem is solved according to the invention by a dialysis device 1, see FIG. 1, that recirculates dialysate in a continuous or tidal mode and that makes use of a purification unit to regenerate the dialysate in-situ. The purification unit is held in a small cartridge 5, see FIG. 2, for daytime use (wearable, carry-on system), see FIG. 3.

The purification unit is designed to bind and remove toxins with a lower diffusivity such as phosphate, small and middle molecules and protein bound toxins (creatinine, beta2 microglobulin, p-cresyl sulfate, indoxyl sulfate, hippuric acid, CMPF).

Figure 4:
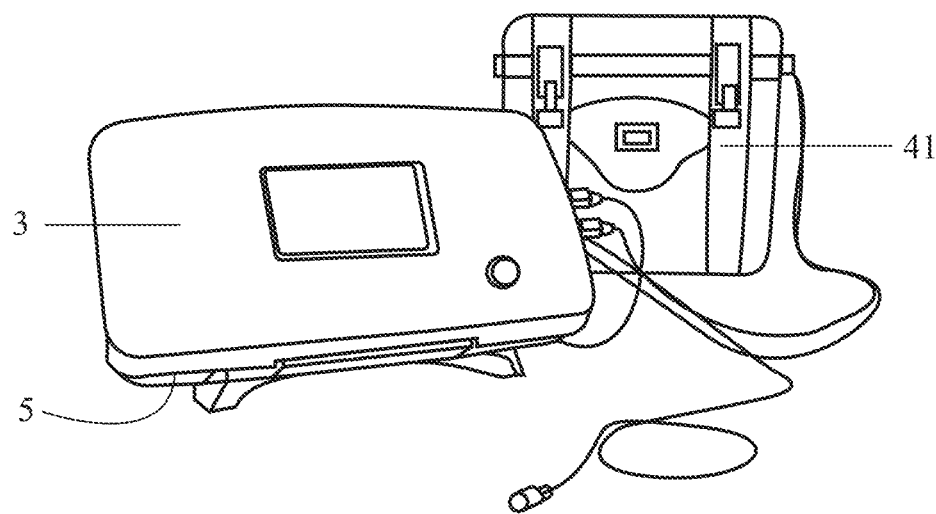
FIG. 4 shows a portable device with extended nighttime cartridge.

For dialysis during the night the cartridge 5 is enlarged with an extension set 41, see FIG. 4 (extended cartridge, portable system). The function of the extension set 41 is to remove also the bulk of the daily produced urea and potassium toxins. These are small ions that diffuse rapidly through the peritoneal membrane and can easily be removed in an overnight session of 8 hours. In case of peritoneal dialysis the extension set offers also the possibility to release an osmotic agent such as glucose if needed for fluid extraction.

The recirculation of dialysate can be continuous or in tidal mode. Continuous circulation demands for a double lumen catheter or two separate catheters. As peritoneal patients usually have one single lumen catheter in place, it is expected that most peritoneal patients will use the system in tidal mode. This is achieved by a pump unit that reverses its direction at certain intervals.

Figure 5:
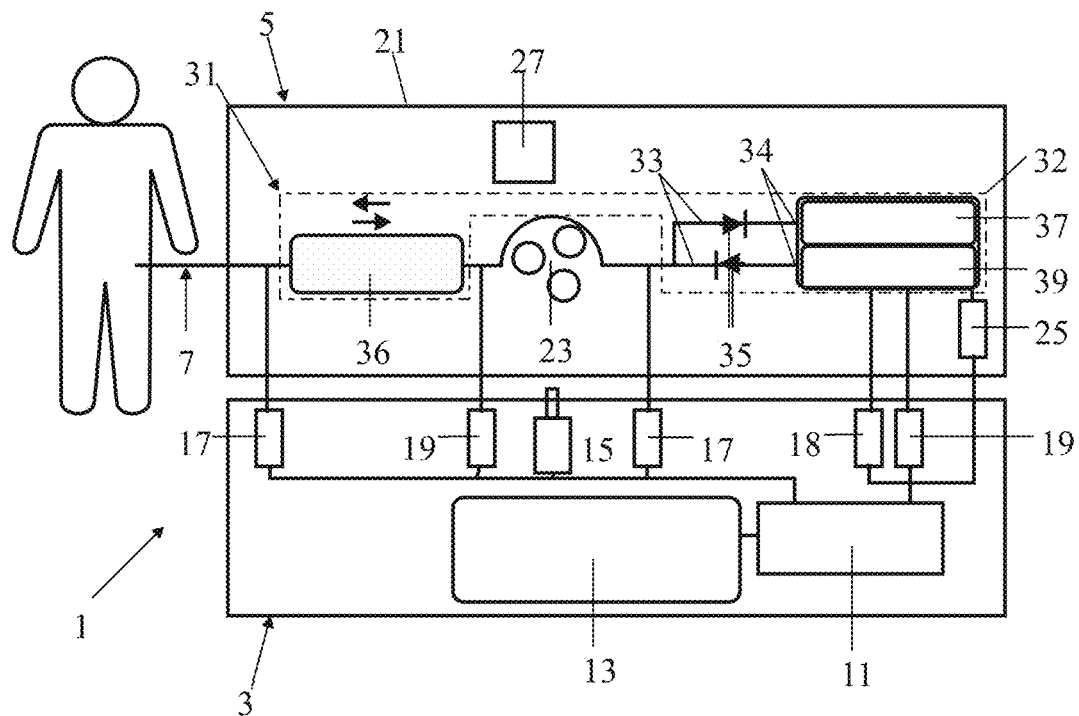
FIG. 5 shows a flow diagram daytime device in tidal mode using a single patient line (and single lumen catheter)

The invented dialysis device 1, see FIG. 5, comprises the following components:
 i. a carrier 3, that holds the electronics 11, user-interface 13, actuators 15 and sensors 17, 18, 19. It actuates, controls and monitors the dialysis operation. It contains the following components: housing with
   main button,
     alarm LED and buzzer,
     power connector (for battery and adapter),
     pump motor
   electronics with
     sensors for temperature 18 (3×), pressure 19 (3×), air/bubble detectors 17 (2)
     display
     main control board (MAB) for the high level control (operation system), user interface and IT communication (webportal)
     hardware control board (HCB): operation of actuators and sensors, hardware safety control, data acquisition and data storage
 ii. a cartridge 5, a replaceable part that is connected to the patient via a flexible tubing 7. The cartridge 5 consists of:
   reusable housing 21 with
     pump 23
     leakage sensor 25
     memory chip 27 (CAB) for cartridge identification and data storage
   purification unit/disposable inlay 31:
     compartment 32 with storage volume 39 for dialysate and a storage volume 37 to hold sorbents
     tubings 33, connectors 34 and check valves 35 (tidal mode)
     particle filter 36
The cartridge 5 is intended for use during the day, as a wearable system (daytime cartridge, wearable daytime device) but can also be used overnight in specific situations.
 iii. an extended cartridge, see FIG. 6, a cartridge 5 as described above but enlarged with an extension set 41. The extension set comprises the following components:
   case 42 with heating element 43, temperature controller 44 and power supply 45 one or more dialysate reservoirs 46 or as alternative options a compartment with sorbents for potassium and urea or an electrosorption unit. In the latter case no dialysate is needed.

The extended cartridge is meant for nighttime use, as portable bedside device (nighttime cartridge, portable nighttime device) but can also be used during daytime when this is better suited.

Figure 2:
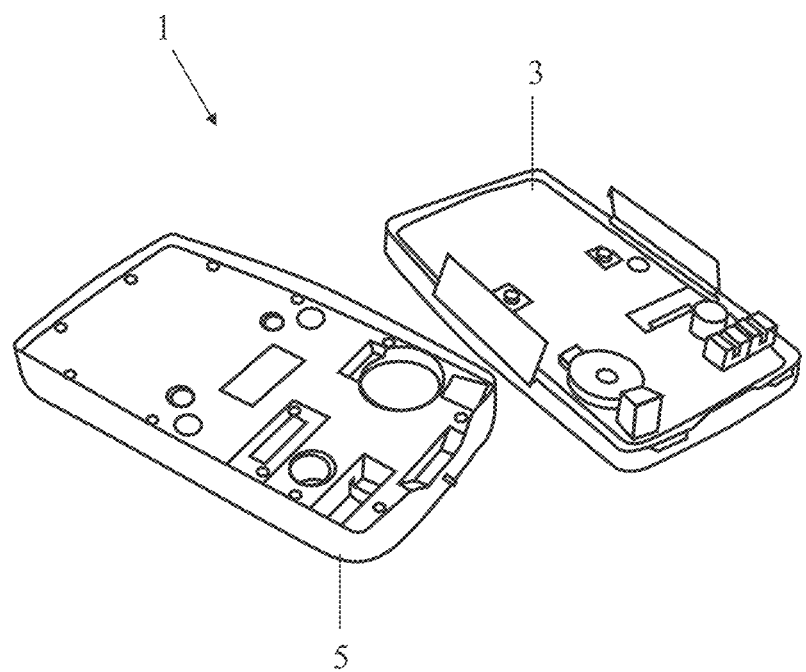
FIG. 2 shows two parts: (a) replaceable daytime cartridge with sorbents and fluidics (left, dark) and (b) carrier with electronics and sensors (right, white)
Figure 3:
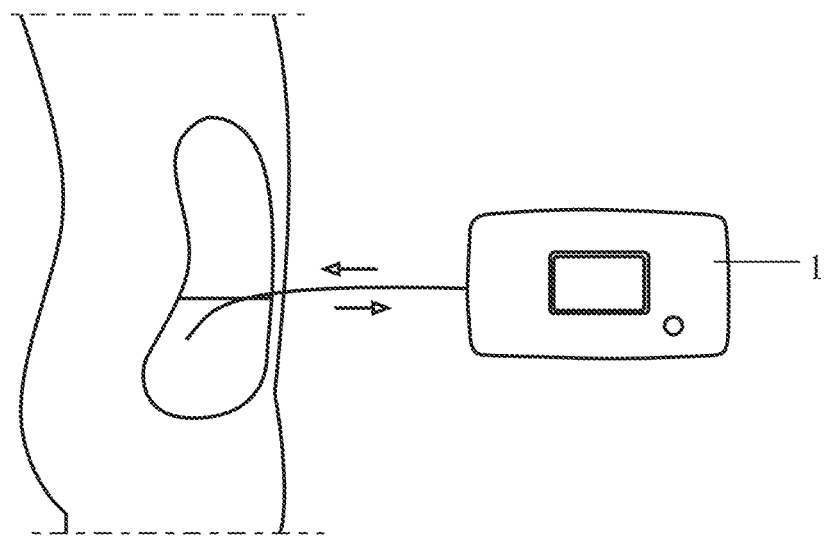
FIG. 3 shows a device operating in tidal mode using a single patient line (and a single lumen catheter)

Prototype versions of the device are shown in FIG. 1 (daytime device), FIG. 2 (carrier and cartridge), FIG. 3 (daytime device connected in tidal mode) and FIG. 4 (nighttime device with extension set).

FIG. 1 shows a prototype version of the device 1. It consists of two parts: a carrier that is mounted on an interchangeable cartridge. These two parts are shown in FIG. 2. The carrier 3 contains the electronics with actuators, sensors and user-interface. This part actuates, controls and monitors the dialysis operation. The cartridge 5 is a replaceable part that holds the fluidic circuit and a purification unit for the regeneration of dialysate.

The device is connected to the catheter of the patient via a fluidic line 7. For patients with a single lumen catheter the device operates in tidal model using a single fluid line. This is illustrated in FIG. 3. Continuous mode is also possible but requires a double lumen catheter or two separate catheters. Thanks to the small dimensions and weight (~2 kg) the patient can easily carry the device with him.

For use at nighttime the cartridge is enlarged with an extension set as is shown in FIG. 4. This enlarged cartridge, the so-called nighttime device is to be used as a portable bedside device.

The enlarged cartridge can be made as a two component set with the replaceable cartridge 5 connected to a separate extension set 41 via tubings as is shown in FIG. 4, but can also be made as one integrated component.

Figure 14:
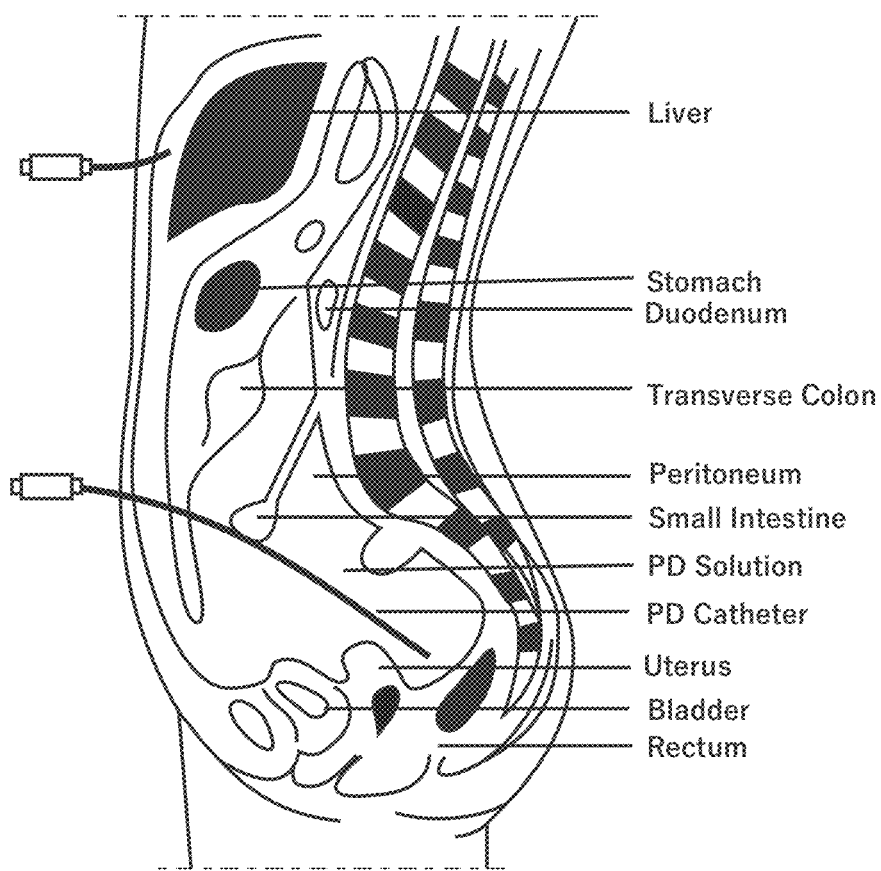
FIG. 14 shows the situation when the device is used with two separate catheters.

Patient connection: the device is connected to the peritoneal catheter of the patient via a single patient line to a single lumen or double lumen catheter (tidal mode) or via a double patient line to a double lumen catheter or two separate catheters (continuous mode). In the preferred embodiment the catheters are placed in such position that the delivery of fresh/refreshed dialysate occurs at the top of the peritoneal cavity and that the retraction of dialysate occurs at the bottom of the peritoneal cavity. This ensures an optimal contact between the dialysate and the peritoneal membrane and promotes a high mass transfer. The preferred positioning and layouts of the catheter(s) are depicted in FIG. 14 with two separate catheters that can be operated both in continuous and tidal mode, in FIG. 15 with a one port double lumen catheter that can only be operated in tidal mode and in FIG. 16 with a two port double lumen catheter that can be operated both in continuous and tidal mode. Most peritoneal patients are equipped with a standard single lumen catheter. In tidal mode this will give a good performance. The enhancement in mass transfer by continuous or semi-continuous tidal flow with such single lumen catheter is however sub-optimal because the in- and outgoing flow of such a catheter takes place in a limited volume of the peritoneal cavity. With two separate catheters or dedicated double lumen catheters as shown in FIGS. 14-16, a larger volume and peritoneal membrane area can be accessed for mass transfer.

In FIG. 14 two separate catheters are shown in the preferred position of one catheter delivering refreshed dialysate at the top of the peritoneum (liver, stomach) and the second catheter retracting fluid at the bottom of the peritoneal cavity. The catheters are placed in the preferred position of one catheter delivering refreshed dialysate at the top of the peritoneum (liver, stomach) and the second catheter retracting fluid at the bottom of the peritoneal cavity. This setup can be used both in continuous mode as well as in tidal mode.

Figure 15:
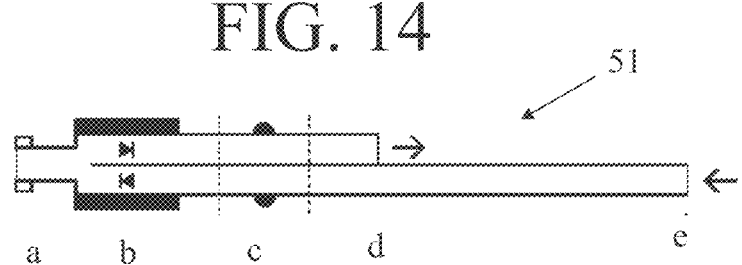
FIG. 15 shows a preferred single port double lumen catheter for use in tidal mode with one lumen delivering fluid at the top of the peritoneum and one lumen retracting fluid at the bottom.

The design of a single port double lumen catheter 51 with one lumen delivering fluid at the top of the peritoneum and one lumen retracting fluid at the bottom is shown in FIG. 15. In this figure is a: luer lock connector, b: flow splitter with internal check valves, c: sub-skin cuff, d: outlet lumen delivering refreshed dialysate at the top of the peritoneum (liver, stomach) and e: entrance lumen retracting fluid from the peritoneal cavity at the bottom. The double lumen catheter has in-built check valves and a flow splitter.

Figure 16:
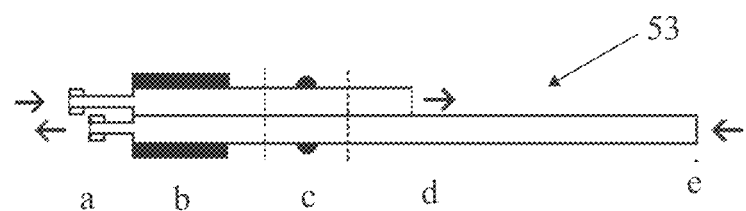
FIG. 16 shows a double port double lumen catheter for use in continuous mode with with one lumen delivering fluid at the top of the peritoneum and one lumen retracting fluid at the bottom.

The design of a double port double lumen catheter 53 with one lumen delivering fluid at the top of the peritoneum and one lumen retracting fluid at the bottom is shown in FIG. 16. In this figure is a: two individual luer lock connectors, b: header, c: sub-skin cuff, d: outlet lumen delivering refreshed dialysate at the top of the peritoneum (liver, stomach) and e: entrance lumen retracting fluid from the peritoneal cavity at the bottom.

Fluid flow: dialysate is extracted and returned to the patient using a pump unit. In the preferred embodiment this is a peristaltic pump with a silicone or similar biocompatible tubing. The dialysate is regenerated by a purification unit containing a volume of dialysate and/or a sorbent system in combination with a nanofilter before it is returned to the patient.

FIG. 5 depicts the fluid circuit of the daytime device in tidal mode using one patient line (connected to one single lumen catheter). Peritoneal dialysate is withdrawn from the abdomen via a nanofilter by a peristaltic pump and stored in a reservoir. Here the peritoneal dialysate is diluted with the dialysate volume and cleansed by the optional sorbent system that absorb the toxins. When the reservoir is full (tidal volume reached) the pump unit reverses and the cleansed dialysate is returned to the patient via the same nanofilter. The process is monitored by sensors for temperature, pressure, fluid leakage and air/gas-inclusions.

Figure 6:
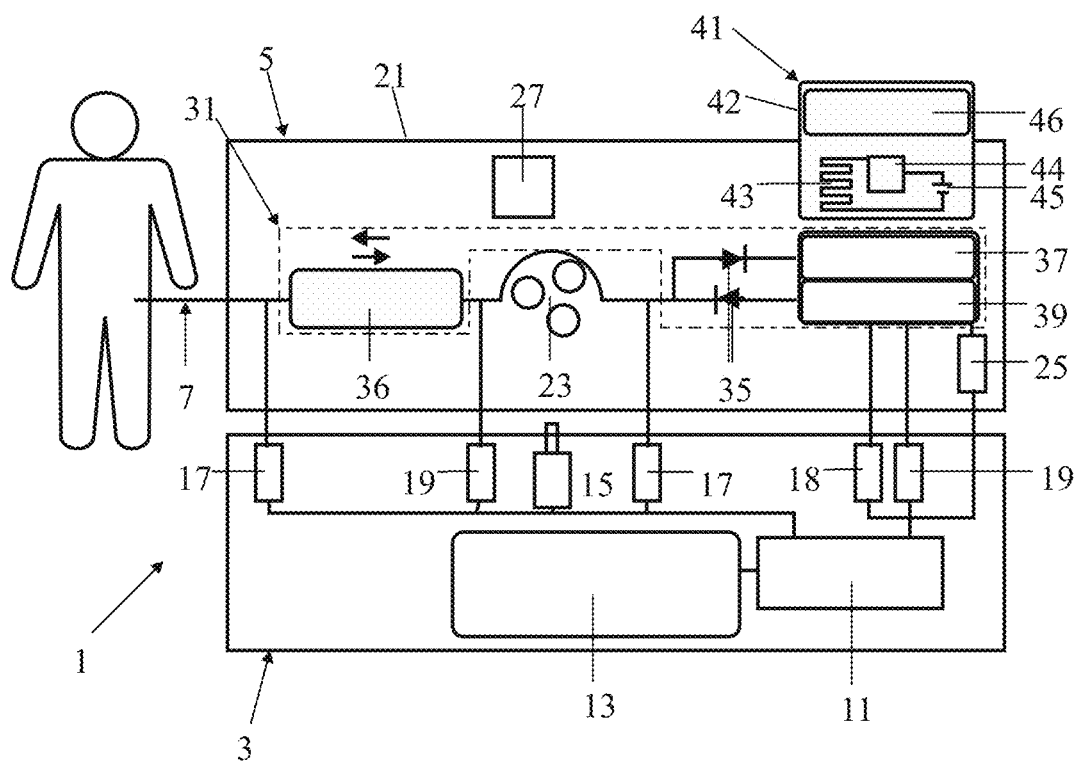
FIG. 6 shows a flow diagram nighttime device in tidal mode, with extended cartridge (extension set), using a single patient line (and single lumen catheter)

In FIG. 6 the fluid circuit is shown for the nighttime device, again in tidal mode, but now including the extension set. In the preferred embodiment the dialysate extracted from the patient is sent to the extension set and then to the purification unit before it is returned to the patient. But it is also possible to send the extracted dialysate first to the sorbent/tidal reservoir and then to the extension set. In that case the two check valves in FIG. 6 should be inverted.

Figure 7:
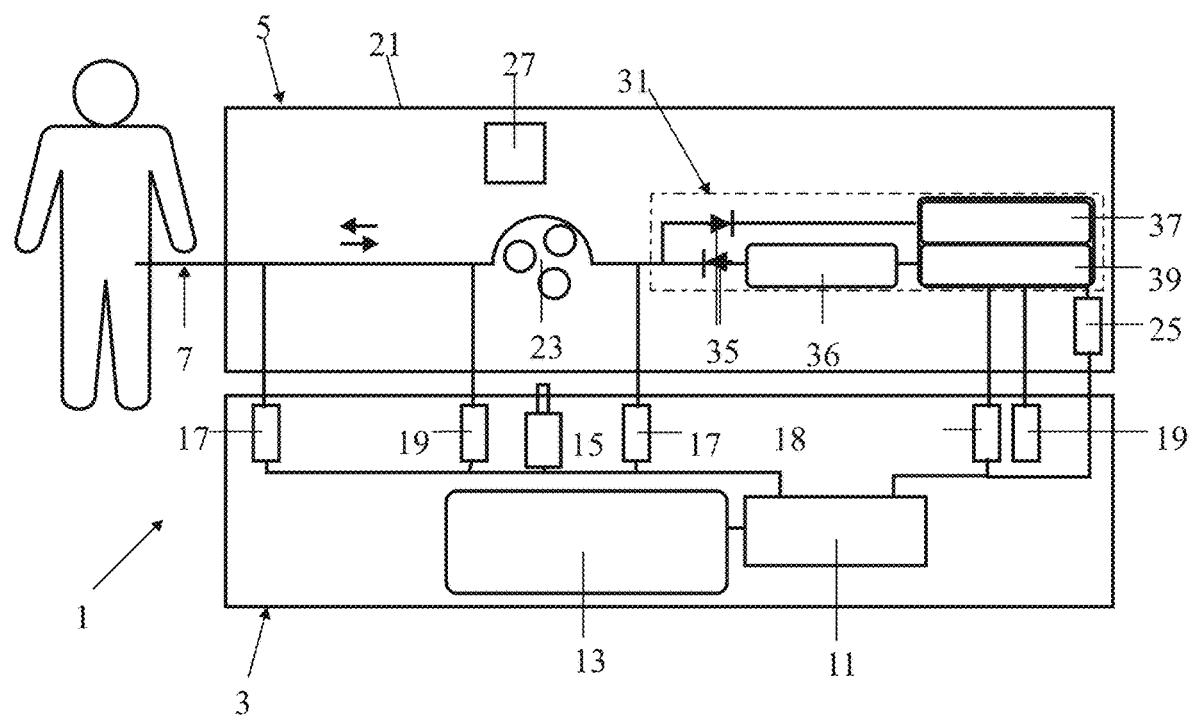
FIG. 7 shows an alternative flow diagram daytime device in tidal mode, with the nanofilter only in the dialysate flow entering the patient.

In FIGS. 5 and 6 a nanofilter is positioned in the patient line. The dialysate flow is then filtered in both directions: the dialysate flow to the peritoneal cavity is filtered to remove potential particles and fines released from the sorbents whereas the flow extracted from the peritoneal cavity is filtered to block large molecules. Large proteins such as albumin and other large molecules such as high molecular weight glucose (large molecular icodextrin, cyclodextrin, highly branched cyclic dextrin, cluster dextrin) cannot pass the nanofilter and are not removed by the device. In general, removal of these large molecules is unwanted. However, in case of patients with less of such needs, an alternative approach is recommended as depicted in FIG. 7. FIG. 7 shows an alternative fluidic circuit where the nanofilter is used for filtering the return flow of cleansed dialysate only and not for filtering the extracted dialysate from the patient's abdomen. Here the nanofilter is placed directly downstream of the purification unit and used as a particle filter solely. In this case the performance of the device is not effected by the dead volume of the nanofilter.

Figure 8:
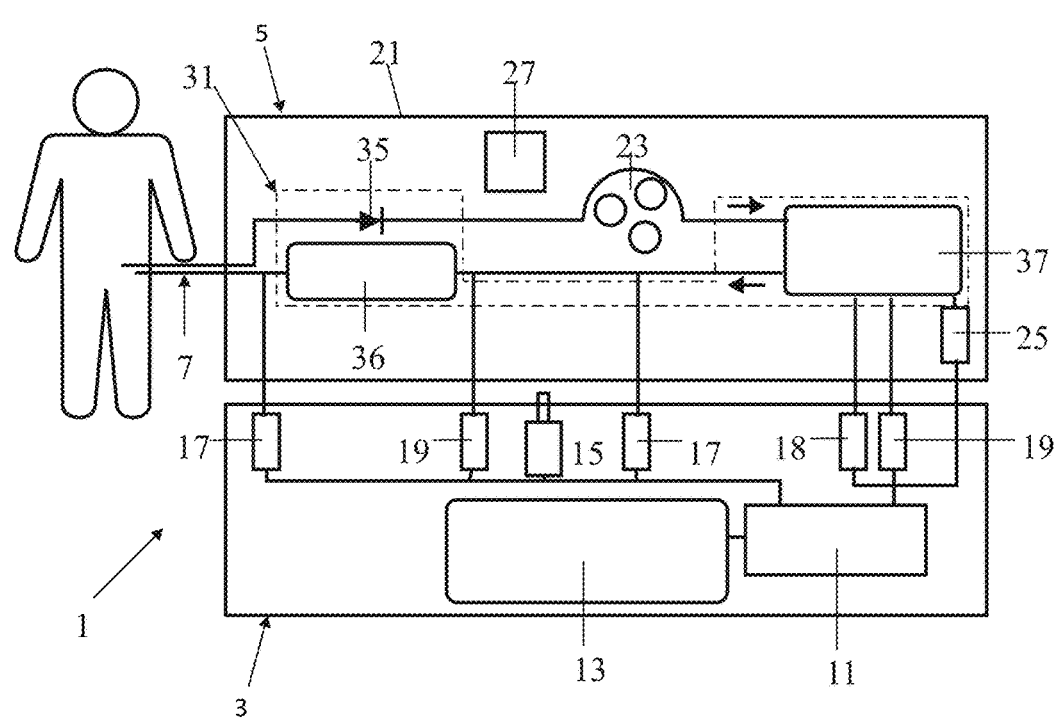
FIG. 8 shows a flow diagram daytime device in continuous flow mode using two patient lines (and two catheters or double lumen catheter)
Figure 9:
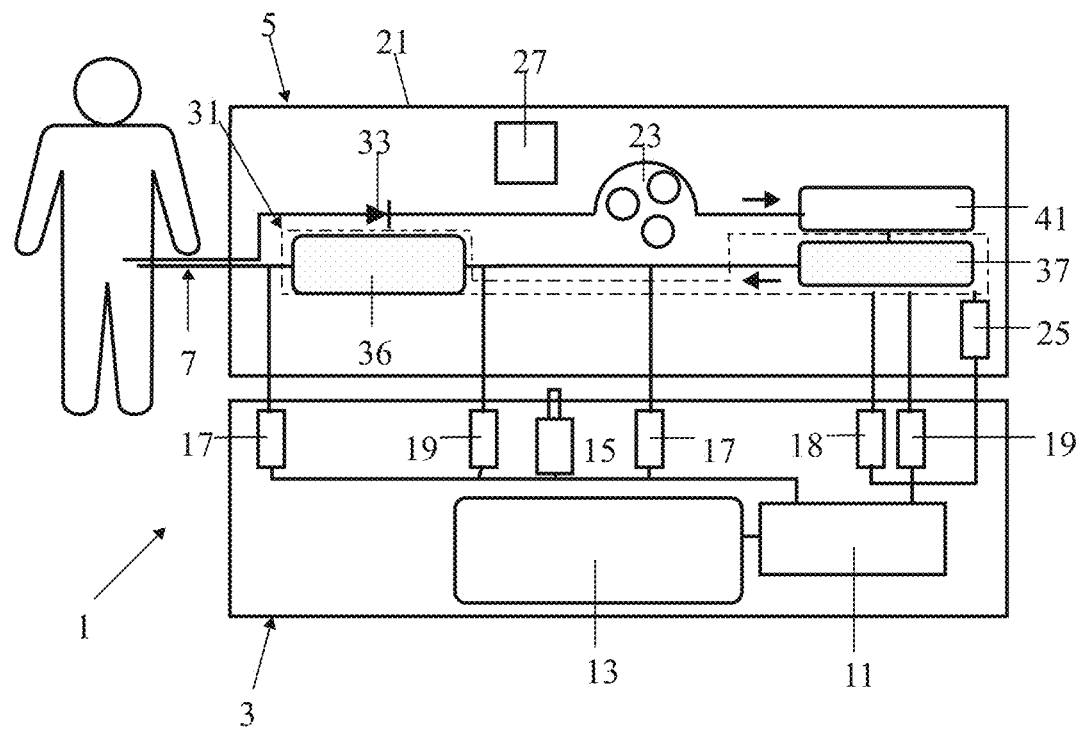
FIG. 9 shows a flow diagram nighttime device with extension set in continuous flow mode using two patient lines (and two catheters or double lumen catheter)
Figure 10:
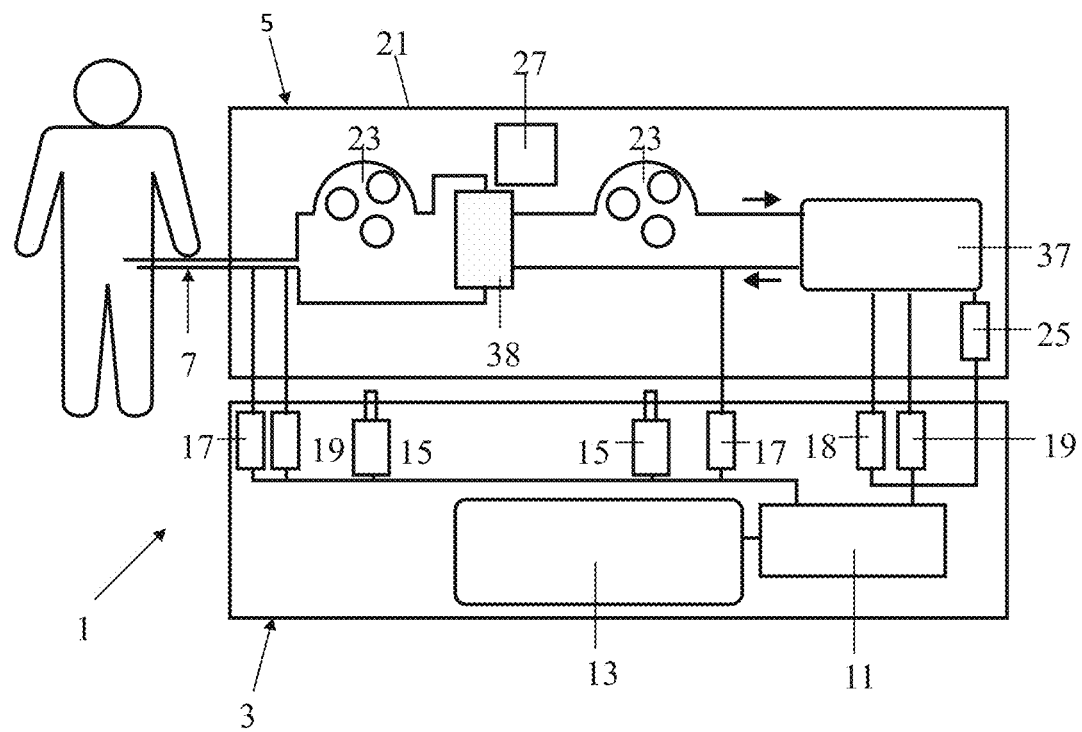
FIG. 10 shows a flow diagram daytime device in dialyzing mode, using a dialyzer filter and two pump units, using two patient lines (and two catheters or double lumen catheter)

In continuous mode the device has two patient lines: one line to extract fluid and one line to return the refreshed dialysate. The related diagrams for continuous mode are given in FIGS. 8 (daytime device) and 9 (nighttime device). FIG. 8 represents the fluidic circuit of the daytime device in continuous mode using two separate fluidic lines for the withdrawal and return of dialysate (requires two catheters or one double lumen catheter). In continuous mode the internal reservoir only contains the sorbents. The fluidic circuit of the nighttime version is shown in FIG. 9. The patient lines are connected to two separate peritoneal catheters or one double lumen catheter. The systems in FIGS. 8 and 9 make use of one peristaltic pump with the nanofilter placed directly downstream of the sorbent unit. In case it is preferred not to remove the larger molecules (albumin, high molecular weight glucose) from the peritoneal cavity a setup can be applied as depicted in FIG. 10 where a dialyzer is used to exchange toxins from the peritoneal cavity to the device. The fluidic content in the abdomen is then being dialyzed similar to the procedure of a hemodialysis machine. The dialysate in the peritoneum is recirculated continuously through the dialyzer filter. Toxins are exchanged from this dialysate to the fluid in the purification unit and extension set. This fluid is recirculated and cleansed by the sorbents and extension set in a continuous mode or in tidal mode using ultrafiltration. The circulation rate of the dialysate in the peritoneum is independent from the circulation rate of the fluid in the purification unit. Such a setup requires two pumping units and a two port access system to the peritoneum such as a double lumen catheter or two separate catheter.

The scheme of FIG. 10 is also applicable for hemodialysis. For hemodialysis the patient lines are connected to the hemodialysis blood access ports (shunt/fistula or CVC catheter). Blood is recirculated through the dialyzer filter. The dialyzer filter separates the blood from the fluid in the purification unit and extension set. Toxins are exchanged from the blood to this fluid across the membrane of the dialyzer filter. The fluid in the purification unit is recirculated and cleansed by the sorbents in the unit and the extension set in continuous mode or in tidal mode using ultrafiltration. The fluid in the purification unit and extension set can be a dialysate such as used in traditional hemodialysis.

Figure 11:
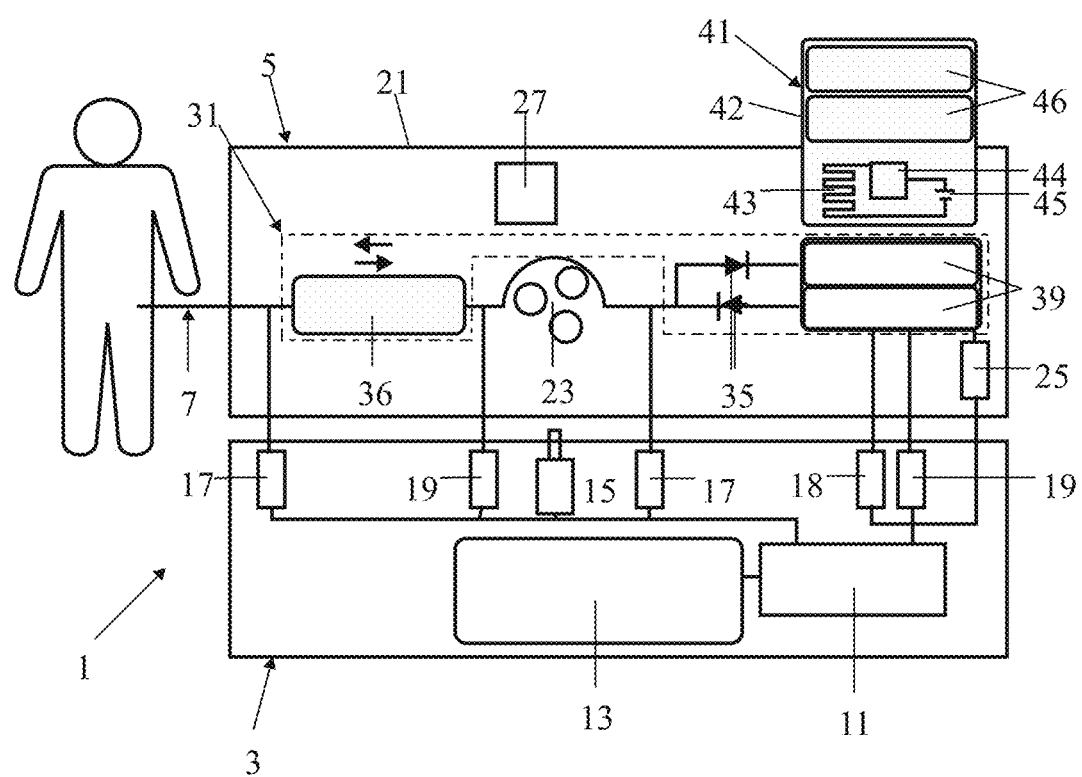
FIG. 11 shows a flow diagram nighttime device in tidal mode with extended cartridge (extension set) without sorbents and without nanofilter.

In FIG. 11 the fluid circuit is shown for the nighttime device in tidal mode including extension set, but now without using sorbents. In that case, the storage volume for the sorbents 37 is omitted or filled with dialysate. In this situation, the peritoneal dialysate in the peritoneal cavity is circulated and diluted with the dialysate in the cartridge and in the extension set. With the absence of sorbents there is no need to install a nanofilter.

Figure 12:
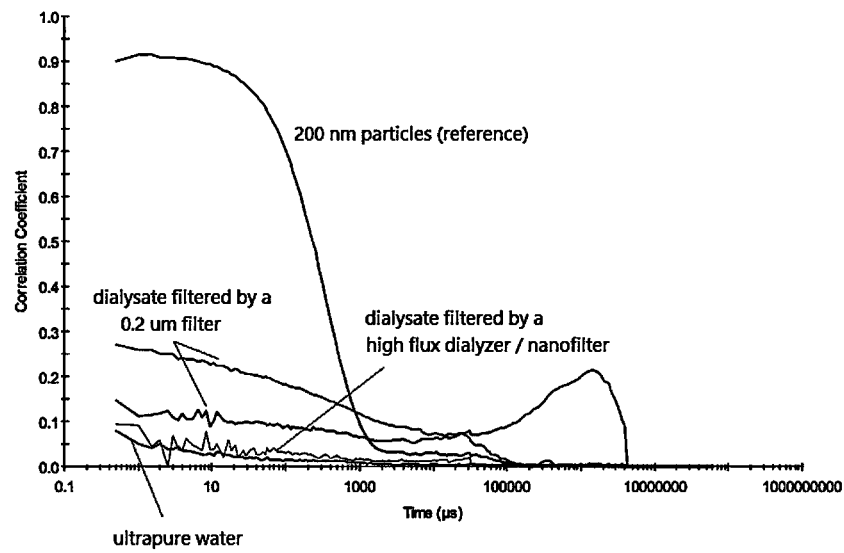
FIG. 12 shows a dynamic light scattering of sorbent purified dialysate filtered by a 0.2 μm filter and by a 3 nm high flux dialyzer filter compared with ultrapure water.
Figure 13:
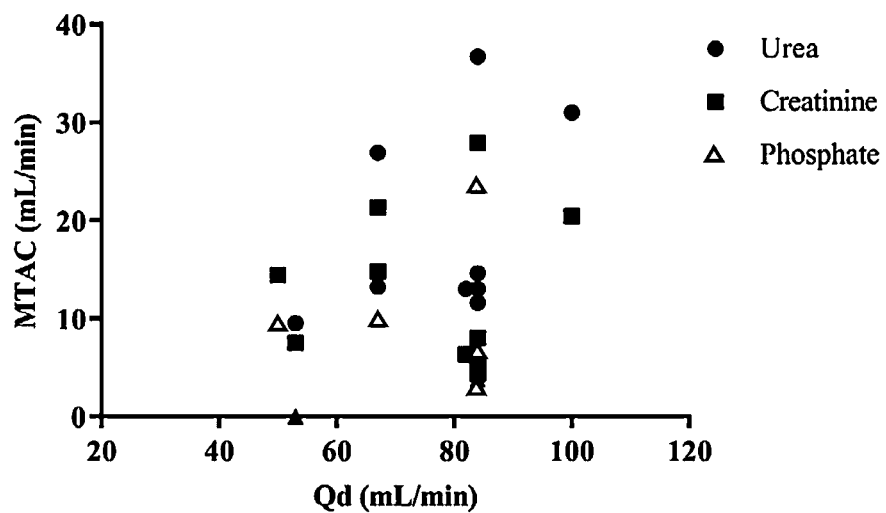
FIG. 13 shows the association between the mean dialysate flow rate (Qd, mL/min) and the mass transfer area coefficient (MTAC, mL/min) of urea, creatinine and phosphate.

Particle filter: the purified dialysate is filtered before it is returned to the patient. FIG. 12 shows the results of a dynamic light scattering (DLS) analysis of sorbent purified dialysate after filtration by a 0.2 µm filter and after filtration by a 3 nm filter (high flux dialyzer). It is shown that submicron fines from the sorbents are not adequately blocked by a 0.2 µm filter and that a nanofilter is required to obtain an ultrapure quality. Therefore a nanofilter (nanofiltration membrane) is applied with a pore size of 1-10 nm. In the preferred embodiment this nanofilter consists of a filter with a pore size of <4 nm, more in particular a dialyzer filter with a pore size in the range of 2-3 nm. Such a dialyzer filter can be a low, middle or high flux dialyzer filter. The nanofilter may also be used to filter the dialysate flow that is withdrawn from the patient. Such a configuration is depicted in FIGS. 5 and 6. Here the nanofilter blocks passage of large molecules (>10 kD for a low flux filter, >30 kDa for a high flux filter) and avoids their removal by the cartridge. Herewith loss of useful components such as albumin and high molecular weight glucose is minimized. Blockage of glucose polymers is recommended in case the extension set is equipped with an electro-oxidation unit. This is to prevent unwanted degradation of the glucose polymers by the electro-oxidation. Blockage of glucose polymers is achieved by using a high molecular weight glucose polymer as osmotic agent, e.g. a glucose polymer with a molecular weight >10 kD in combination with a low flux filter with a cut-off <10 kD. In other configurations the preferred embodiment will contain a high flux filter to allow removal of middle molecules such as beta2microglobulin. The combination of the nanofilter with a dialysate filling with high molecular weight glucose polymer (preferably >30 kDa, maltodextrin, highly branched cyclic dextrin) as an osmotic agent would allow very low glucose additions for ultrafiltration as these molecules cannot pass the filter and are retained in the peritoneal cavity while the take-up by lymphatic absorption for these large molecules is low.

Purification unit: the disposable inlay of the cartridge holds a storage volume for dialysate and a storage volume for the sorbent system. The two volumes can be in two separate compartments or can be combined in one overall compartment. The design and in- and outlet of the compartment(s) is such that the risk for shortcut-flow is minimal. In the preferred embodiment the disposable inlay is made of a flexible bag in view of low manufacturing costs and ease of sterilization.

Sorbents: the sorbent system is designed to bind toxins with a low diffusivity such as phosphate, small and middle molecules and protein bound toxins (creatinine, beta2 microglobulin, p-cresyl sulfate, indoxyl sulfate, hippuric acid, CMPF). It comprises of two components: (1) active carbon for the removal of organic toxins and (2) a phosphate binder such as ferricoxyhydroxide or lanthanum carbonate or carrier materials (polystyrene, starch) containing metal complexes of ferric or lanthanum. In the preferred embodiment the phosphate binder is a polystyrene modified with ferric oxyhydroxide. The sorbent volume may range from 100-2000 ml, but typically will amount to 400-600 ml. Next to binding of toxins the sorbents also act as a buffer system for glucose (additional function active carbon) and for bicarbonate or lactate (additional function phosphate binder), see below.

Optionally the sorbent system may comprise a third component for the removal of unwanted contaminants that might be present in the dialysate. A typical example are the glucose degradation products (mainly aldehydes) that might be present in peritoneal dialysate. These contaminants can be removed by a dedicated active carbon (oxidized or chemically pretreated) or by a third sorbent. In case of glucose degradation products this third component can be an aldehyde scavenger such as Lewatit VP OC 1065 or DIAIONcr20.

Preloading: sorbents are preloaded with specific compounds to achieve a neutral behavior (no adsorption or release of electrolytes) or a specific adsorption or release (bicarbonate, lactate, glucose). The sorbents are hereto equilibrated with a conditioning fluid of neutral pH (6-7.4) containing electrolytes ($Na^+$, $Mg^{2+}$, $Ca^{2+}$, $Cl^-$), bicarbonate, lactate and/or glucose ions. Bicarbonate and lactate ions are trapped by the phosphate binder. The trapped bicarbonate and lactate ions are released upon ion exchange with the phosphate from patient's dialysate during the treatment.

The release of bicarbonate and lactate will contribute to a healthy acid base balance in the patient. The preloading concentrations are typically similar to the concentrations in the peritoneal dialysate of the extension set, but can also be lower or higher in case absorption or additional release is demanded. Preloading with magnesium and calcium ions is usually not needed and omission of these ions will eliminate the chance on possible precipitation of calcium and magnesium carbonate during storage. In case formation of glucose degradation products might occur during sterilization (e.g. during heat sterilization) it is recommended to omit glucose in the preloading of the sorbents. The active carbon will initially adsorb glucose from the dialysate solution but the adsorbed glucose will be released later on (partially) when the glucose level drops. The active carbon serves as a glucose buffer and provides peak shaving and stabilization of the glucose level. In very specific situations the sorbents might be preloaded also with other constituents such as vitamins and anti-oxidants such as ascorbic acid, glutathione or cysteine compounds to preserve the patient against oxidative stress.

Purification unit without sorbents: the system can also be operated without a sorbent system. In that case, the storage volume for the sorbents is omitted or filled with dialysate. In this situation, the peritoneal dialysate in the peritoneal cavity is continuously circulated and diluted with the dialysate in the device. In fact the dialysate volume in the peritoneal cavity is expanded with the external dialysate in the cartridge and extension set. The efficacy of such a system without sorbents remains high compared to CAPD and APD because the continuous recirculation allows for multiple reuse of dialysate, which is more efficient, and it provides better mixing and mass transfer in the peritoneum. The sorbent-free setup is especially valuable in combination with the enlarged cartridge filled with dialysate, as the larger dialysate volume prevents saturation. But it can also be considered for daytime use with the replaceable cartridge. In that case, the cartridge will typically contain a dialysate volume of 1000-2000 ml. Without sorbents, there is no risk of particle release and therefore the nanofilter can be omitted as well. The omission of the sorbents and filter helps to reduce the cost of the dialysis treatment. The setup for such a system is depicted in FIG. 11 with—as an example—two dialysate compartments 39 in series in the cartridge and two dialysate compartments 46 in series in the extension set. The use of more than one dialysate compartment helps to reduce a short cutting flow of the dialysate during circulation and offers the opportunity of using of a combination of dialysates e.g. two or three dialysates with a different glucose concentrations to establish a uniform glucose load during the treatment.

Tidal mode: the dialysate volume may range from 50-500 ml but typically will amount to 200-300 ml. In tidal mode this volume is cycled in and out of the peritoneal cavity at a flow rate of 50-300 ml/min. At a flow rate of typically 200 ml/min in tidal mode the hourly circulation of dialysate amounts to 6 liters. For a nighttime session this means a dialysate circulation volume of 48 liters. In current CAPD and APD procedures only 8-15 liters of dialysate is flushed in and out. The high circulation volume augments the mass transfer along the peritoneal membrane. Hereby the efficacy of the dialysis treatment is enhanced. During daytime a similar volume can be recirculated at a flow rate of 100 ml/min.

Fluid management: in case of continuous circulation (two catheters/double lumen catheter) the patient can select a suitable flow rate typically in the range of 50-300 ml/min. The pump speed is set according this flow rate. In the case of tidal mode (single lumen catheter), the fluidic flow is defined by two adjustable parameters: the tidal volume that goes in and out of the peritoneal cavity and the flow rate. The tidal volume can be controlled e.g. by a timer during the cycle of entering dialysate into the abdomen. The cycle time is then equal to the tidal volume divided by the flow rate. At the end of this cycle, the pump is reversed in direction and dialysate is pumped out of the cavity into the tidal reservoir of the device. A sensor monitors the filling of the reservoir during this cycle. This can be any type of sensor. In case of the preferred embodiment where the tidal reservoir is made of a flexible bag the sensor can be a simple pressure or force sensor.

Air/bubble detection: the dialysate going in and out of the peritoneal cavity is monitored by an air/gas bubble detector, typically an ultrasonic detector that is clamped on the patient line at the outlet of the device. Detection of an air/gas bubble will raise an alarm and will lead to an automatic stop of the device. A second air/bubble detector is placed in-between the particle filter and the sorbent compartment. When air or a gas bubble is detected in tidal mode during the cycle that dialysate is entered into the peritoneal cavity, the pump direction is reversed and the air or gas bubble is pumped back into the sorbent compartment where it is trapped (internal air/bubble removal system).

Prevention of under/overfilling: to limit the risk of unintended under- or overfilling of the peritoneal cavity the system is equipped with sensors that monitor the filling pressure (pressure sensors), fluid loss (leakage sensor) and air in-leak (air/bubble detectors).

Detection of leakage: leakage might occur due to a bad connection or a mechanical failure in the tubing or fluidic system. Fluidic loss is detected by a leakage sensor, e.g. a conductivity sensor. Air in-leak is detected by one of the air/bubble detectors.

Detection blockage fluid line: blockage of the fluid line is detected by a pressure/force sensor in or on the patient line.

Extension set: the cartridge extension set 41 comprises of a case 42 with a heating element 43, a temperature control unit 44 and a power supply 45. It may hold a dialysate reservoir 46 of 5-15 L, typically 7-10 L. In the preferred embodiment this reservoir 46 has a volume of 9-10 L and is made of a flexible bag system (one or more bags) that can be placed in the case 42. This reservoir 46 is filled with a traditional peritoneal dialysate formulation containing NaCl, $MgCl_2$, $CaCl_2$, Na-bicarbonate and/or Na-lactate and glucose and/or icodextrin. The actual composition is fine-tuned by a medical doctor according to the patient needs. The reservoir is recirculated by the device as depicted in FIGS. 6 and 9. The function of the reservoir is to add storage capacity for toxins such as urea and for potassium and to release the glucose needed for ultrafiltration (fluid extraction).

Even release of glucose: the active carbon in the cartridge acts as a buffer for the glucose: it adsorbs glucose at the start when the glucose concentration is relatively high and releases the glucose when the glucose concentration drops due to dilution (ultrafiltration) and reabsorption by the patient. The glucose level is therefore stabilized and the maximum peak concentration can be kept at a much lower level than in traditional PD. In case no sorbent system is used, the dialysate reservoir in the extension set can contain two dialysate compositions divided in two separate compartments in series: a low glucose dialysate (e.g. 1-2% glucose) in the compartment to enter the patient first, and a higher glucose (e.g. 2-4% glucose) dialysate in the second compartment. By the time that the low glucose dialysate compartment has entered the patient, the higher glucose compartment will have been diluted in glucose by the returned dialysate effluent from the patient. Such a setup can be refined with three or more dialysate compositions in a multiple bag system. The same is true for the dialysate composition in the replaceable cartridge being filled with a dialysate with no glucose in combination with the sorbents or with a dialysate having zero to low glucose loading (e.g. 1-2%) in case the cartridge contains no sorbents and is being used in combination with an extension set that is filled with a dialysate with a higher glucose concentration.

Alternative extension set: the extension set may hold as alternative option to the dialysate reservoir an electro-oxidation unit or electrocatalytic sorption unit as described in WO2012060700 and WO2015060716. The content of these two patent applications is herewith incorporated by reference. When the electro-oxidation unit holds a potassium binder (cation exchanger) it provides the capacity for removing both urea and potassium without the need of dialysate. The volume of such an extension set is typically 1-1.5 L. In that case a high molecular weight glucose polymer as osmotic agent is to be used in the dialysate filling of the patient in combination with a low flux filter. The low flux filter blocks the passage of the glucose polymers to the electro-oxidation unit, hereby preventing glucose degradation. As a safety measure a release system for an anti-oxidant (such as ascorbic acid, glutathione, cysteine compounds) can be implemented. Such a system can be an active system with a small pump and anti-oxidant reservoir or can be a passive system via release of anti-oxidants from preloaded sorbents.

Alternative extension set: the extension set may hold as alternative option to the dialysate reservoir a compartment with sorbents for urea and potassium. This may reduce the volume of the extension set to 2-3 L. This option requires a separate infusion or release system for glucose or similar osmotic agent.

EXAMPLES

Prototypes of the device as depicted in FIGS. 1-6 and 11 have been tested in vitro as well as in vivo (animal model) to validate the biocompatibility and efficacy of the new system. The prototypes were equipped with cartridges holding 325 ml active carbon, 135 ml phosphate binder (ferricoxyhydroxide) and were operated in tidal mode with a tidal volume of 200-300 ml with a flow rate of 150-200 ml/min. Also cartridges that did not contain sorbents but only dialysate were tested and evaluated. The experiments were carried out with daytime cartridges and with nighttime cartridges using an extension set holding 9 L and 10 L dialysate. Typical duration of each experiment was 8 hours and in some cases 16 hours. An increase in mass transfer area coefficient (MTAC) has been observed for potassium (175%), urea (200%), creatinine and phosphate (250%) in comparison to a static dwell (standard peritoneal permeability analysis, SPA). The increase is attributed to the effect of continuous recirculation of the dialysate. The absorption capacity of the system depends on the amount of dialysate and sorbents employed. With the above mentioned volumes of sorbents and dialysate, the absorption capacity has proven to be very adequate resulting in a significant increase in clearance.

On the basis of these findings, scenarios for daily use by a patient were evaluated. This concerns scenarios in which the nighttime system is used for 8 hours at night followed by a static dwell of dialysate for 16 hours during daytime (scenario A), or followed by two static 8 hour dwells (scenario B) or with one static dwell of dialysate for 16 hours in combination with the use of the daytime system for 4 hours (scenario C) or 8 hours (scenario D) during the day.

The evaluation was performed using a physiological model that predicts daily clearance based on a balance between the formation of toxins in the body, the mass transfer through the peritoneal membrane to the dialysate and the uptake of toxins by the dialysate and adsorption by sorbents in the purification unit for a 24 hour cycle.

Example 1: Nighttime System 10 L Dialysate

A patient with a weight 72 kg and 42 L body water is treated by the nighttime system for 8 hours during the night. The system is equipped with a cartridge and a dialysate extension set containing only dialysate, no sorbents. The total dialysate volume is 10 L. After this treatment the patient receives a new dwell of 2 L fresh dialysate (icodextrin) in the morning to last for the rest of the day, so 16 hours (scenario 1a) or one dwell of 2 L icodextrin to last for 8 hours and a second dwell for again 8 hours (scenario 1b) or one static dwell of 2 L icodextrin to last for 16 hours in combination with a 4 hour treatment with the daytime cartridge to start after 6 hours (scenario 1c) or an 8 hour treatment with the daytime system after 4 hours of the start of static dwell. The daytime cartridge is filled with sorbents (325 ml active carbon, 135 ml phosphate binder) and some dialysate. The total volume is 1 L. The daily toxin production in the patient is set to 240 mmol urea, 40 mmol potassium, 15 mmol phosphate and 10 mmol creatinine. During the operating hours of the system with the nighttime cartridge or the daytime cartridge in place, the dialysate is recirculated and the mass transfer is augmented with a factor two.

| | Nighttime cartridge without sorbents | |
|---|---|---|
| Scenario 1 night 8 hr | nighttime cartridge | 10 L dialysate, no sorbents |
| 1a) daytime 16 hrs | 2 L icodextrin | one dwell of 16 hours |
| 1b) daytime 8-8 hrs | 4 L icodextrin | two dwells of 8 hours |
| 1c) daytime 6-4-6 hrs | 2 L + daytime cartridge | one dwell, daytime cartridge 4 hours |
| 1d) daytime 4-8-4 hrs | 2 L + daytime cartridge | one dwell, daytime cartridge 8 hours |

For each scenario the daily clearance is predicted by the model and compared with the clearance of the current practice in peritoneal dialysis treatment, CAPD and APD, with values that are predicted by the same model being in good agreement with values from practice.

The clearance results are listed in the table "Scenario 1 Nighttime cartridge 10 L dialysate". The most simple scenario with only one dwell during the day gives a 30% higher clearance than current practice (scenario 1a). With two dwell during daytime the increase rises 60% (scenario 1b). In scenario 1c, a single dwell during daytime combined with the use of the daytime system for 4 hours, the increase in clearance rises to 85%. Longer use of the daytime system leads to a further gain in clearance up to 120%, scenario 1d.

With the help of the daytime system, the patient can improve the clearance to about a factor 2. Without the daytime system the improvement is limited to 30-60%. Nevertheless still a significant step forward. The listed increase in clearance for potassium is actually too high and would cause hypokalemia. This can be counteracted by preloading the dialysate with some potassium.

Scenario 1 Nighttime Cartridge 10 L Dialysate

| Daily clearance (ml/min) | urea | creatinine | phosphate | potassium |
|---|---|---|---|---|
| 1a) nighttime + 1 dwell | 7.4 | 6 | 5.5 | 7.2 |
| 1b) nighttime + 2 dwells | 9.6 | 7.4 | 6.7 | 8.7 |
| 1c) nighttime + 1 dwell/daytime sys 4 hrs | 8.4 | 8.9 | 7.6 | 8.5 |
| 1d) nighttime + 1 dwell/daytime sys 8 hrs | 9.3 | 10.9 | 9.1 | 9.5 |
| conventional CAPD/APD | 5.8 | 4.6 | 4.1 | 5.5 |

Example 2: Nighttime System 2 L with EO Unit and Sorbents

The conditions, scenarios and procedures are identical to example 1. But in this scenario the extension set comprises an electro-oxidation unit (EO unit) to remove of urea and other organic toxins. The total volume of the nighttime cartridge including this extension set is only 2 L. Next to the EO unit it contains 300 ml phosphate sorbent, 150 ml potassium sorbent and 400 ml active carbon. The resulting volume is filled with dialysate. The daytime cartridge is similar to example 1 and is filled with 325 ml active carbon and 135 ml phosphate binder with a total volume of 2 L. The EO unit is operated at 6 A to remove urea at rate of 20 mmol/hour.

The clearance results are listed in the table "Scenario 2 Nighttime cartridge 2 L with EO unit and sorbents". The most simple scenario with only one dwell during the day gives an improvement in clearance of 40-60% for creatinine and phosphate compared to current practice (scenario 2a). With two dwell during daytime the increase rises to 80% (scenario 2b). In scenario 1c, a single dwell during daytime combined with the use of the daytime system for 4 hours, the increase in clearance reaches 100% for creatinine and phosphate (scenario 2c) and with 8 hours use even 130-150%, according to scenario 2d. In this setup, the increase in clearance for potassium has been limited in order to prevent hypokalemia. The increase in urea clearance has been limited to 50% (sufficient) but could be increased by applying more electrical power to the EO unit.

Scenario 2: Nighttime Cartridge 2 L with EO Unit and Sorbents.

| Daily clearance (ml/min) | urea | creatinine | phosphate | potassium |
|---|---|---|---|---|
| 2a) nighttime, 1 dwell | 7 | 7.1 | 6 | 6.4 |
| 2b) nighttime, 2 dwells | 8.5 | 8.5 | 7.2 | 6.4 |
| 2c) nighttime, 1 dwell, daytime 4 hrs | 8.7 | 9.7 | 8 | 6.4 |
| 2d) nighttime, 1 dwell, daytime 8 hrs | 9.3 | 11.8 | 9.4 | 6.4 |
| CAPD/APD as reference | 5.8 | 4.6 | 4.1 | 5.5 |

The invention claimed is:

1. A device for the removal of toxins from a patient by dialysis, said device comprising:
   i) a carrier comprising the electronics including control software, a user-interface, actuators and sensors, which carrier is configured to actuates, controls and monitors the dialysis operation;
   ii) a replaceable cartridge with a flexible tubing configured to connect to the patient, which cartridge is connected to the carrier, said replaceable cartridge includes a reusable housing with a pump, a leakage sensor, a memory chip for cartridge identification and data storage, said replaceable cartridge further includes a purification unit held inside said replaceable cartridge, said purification unit includes a compartment for holding dialysate and a sorbent system with a particle filter, said purification unit further includes tubings, connectors, check valves; and
   iii) an extension set that is connected to the replaceable cartridge comprising one or more additional compartments for holding dialysate mounted in a case with a heating element, a temperature controller and a power supply for the heating element, said one or more additional compartments is connected in series to said compartment of the purification unit and configured for providing recirculating flow dialysis in series.

2. Device according to claim 1, wherein the sorbent system comprising:
   i) active carbon for binding organic toxins and for buffering glucose or glucose polymers hereby preventing that the peritoneal membrane is exposed to high glucose peaks, and
   ii) an anion binder for removing phosphate and for buffering bicarbonate and/or lactate stabilizing the release of bicarbonate and/or lactate,
   iii) optionally a sorbent for the scavenging of contaminants that might be present in the dialysate.

3. Device according to claim 1, wherein the one or more additional compartments of the extension set are filled with fresh dialysate comprising NaCl, $MgCl_2$, $CaCl_2$), Na-bicarbonate and/or Na-lactate and glucose, glucose polymers or other osmotic agent needed for ultrafiltration.

4. Device according to claim 1, wherein the two or more additional compartments are connected in series, each filled with a dialysate of different composition, configured to achieve an even release of glucose during the treatment, a low concentration osmotic agent in the compartment that is first circulated to the patient and a higher concentration of osmotic agent in the upstream compartment(s).

5. Device according to claim 1, wherein the extension set comprises dialysate comprising NaCl, $MgCl_2$, $CaCl_2$), Na-bicarbonate and/or Na-lactate and glucose, glucose polymers or other osmotic agent needed for ultrafiltration in combination with a sorbent system comprising:
   i) active carbon for binding organic toxins and for buffering glucose or glucose polymers hereby preventing that the peritoneal membrane is exposed to high glucose peaks, and
   ii) an anion binder for removing phosphate and for buffering bicarbonate and/or lactate stabilizing the release of bicarbonate and/or lactate,
   iii) optionally a sorbent for the scavenging of contaminants that might be present in the dialysate such as glucose degradation products, complemented with sorbents for the removal of potassium and urea.

6. Device according to the preceding claim 1, wherein when a high molecular weight glucose polymer as osmotic agent is used as dialysate, the extension set further comprises a compartment with an electrocatalytic sorption unit for urea removal in combination with a potassium binding sorbent equipped with a low flux filter that blocks high molecular weight glucose polymers to pass to the electro-catalytic sorption unit.

7. Device according to claim 2, wherein the sorbents in the purification unit and the extension set are preloaded with electrolytes, bicarbonate, lactate and glucose or glucose polymers or other suitable osmotic agents for ultrafiltration and anti-oxidants.

8. Device according to claim 1, wherein the device is configured to connect to a single lumen or double lumen catheter via a single patient line, or to connect to a double lumen catheter or two separate catheters via a double patient line.

9. Device according to claim 1, wherein the device is configured to be connected to a one port double lumen catheter that is operated in tidal mode.

10. Device according to claim 1, wherein the device is configured to be connected to a two port double lumen catheter that can be operated both in continuous and tidal mode.

* * * * *